United States Patent
Hildebrandt et al.

(10) Patent No.: US 11,201,558 B2
(45) Date of Patent: Dec. 14, 2021

(54) OPERATING CIRCUIT FOR COUPLING A SYNCHRONOUS MACHINE WITH A VOLTAGE NETWORK AND METHOD FOR OPERATING IT

(71) Applicant: GE Energy Power Conversion Technology Limited, Rugby (GB)

(72) Inventors: Hani Sebastian Hildebrandt, Berlin (DE); Stefan Reschberger, Berlin (DE)

(73) Assignee: GE Energy Power Conversion Technology Limited, Warwickshire (GB)

( * ) Notice: Subject to any disclaimer, the term of this patent is extended or adjusted under 35 U.S.C. 154(b) by 178 days.

(21) Appl. No.: 16/281,731

(22) Filed: Feb. 21, 2019

(65) Prior Publication Data
US 2019/0260299 A1 Aug. 22, 2019

(30) Foreign Application Priority Data
Feb. 21, 2018 (EP) .................................... 18157775

(51) Int. Cl.
*H02M 5/45* (2006.01)
*H02M 1/36* (2007.01)
(Continued)

(52) U.S. Cl.
CPC ........... *H02M 5/4505* (2013.01); *H02M 1/36* (2013.01); *H02M 5/272* (2013.01); *H02M 5/452* (2013.01);
(Continued)

(58) Field of Classification Search
CPC . H01F 38/14; H01F 3/10; H01F 27/28; H01F 41/04; B60L 53/126; B60L 53/305;
(Continued)

(56) References Cited

U.S. PATENT DOCUMENTS

| 4,481,455 A * | 11/1984 | Sugimoto ................. H02P 1/30 |
| | | 318/732 |
| 2006/0214645 A1* | 9/2006 | Rufer .................. H02M 5/4585 |
| | | 322/28 |

FOREIGN PATENT DOCUMENTS

| AT | 315301 B | 5/1974 |
| DE | 1588058 A1 | 7/1970 |

(Continued)

OTHER PUBLICATIONS

European Search Report and Written Opinion dated Aug. 27, 2018 which was issued in connection with EP 18157775.0 which was filed on Feb. 21, 2018.

(Continued)

*Primary Examiner* — Hal Kaplan
*Assistant Examiner* — Thai H Tran
(74) *Attorney, Agent, or Firm* — Wood IP LLC (57) ABSTRACT

An operating circuit and a method for operating a synchronous machine on a voltage supply network is disclosed. The operating circuit has a converter circuit with controllable converter switches and a controllable switching arrangement to switch the converter circuit between a start converter configuration and a direct converter configuration. The power supply network is connected to a converter output and the synchronous machine is connected to a converter input of the converter circuit. In the direct converter configuration, an AC voltage is provided at the converter output with a preset AC voltage frequency. In the direct converter configuration, the switching of the AC voltage between the converter input and the converter output takes place without intermediate rectification.

14 Claims, 9 Drawing Sheets

(51) Int. Cl.
   *H02P 1/52*     (2006.01)
   *H02P 9/08*     (2006.01)
   *H02M 5/452*    (2006.01)
   *H02M 5/27*     (2006.01)
   H02P 27/16      (2006.01)
   H02P 9/48       (2006.01)

(52) U.S. Cl.
   CPC .................. *H02P 1/52* (2013.01); *H02P 9/08* (2013.01); *H02P 9/48* (2013.01); *H02P 27/16* (2013.01)

(58) Field of Classification Search
   CPC .......... B60L 53/12; B60L 53/30; H02J 50/10; Y02T 10/70; Y02T 10/7072; Y02T 90/14; Y02T 90/12; Y02T 90/16; B60Y 2200/91
   See application file for complete search history.

(56) References Cited

FOREIGN PATENT DOCUMENTS

| | | |
|---|---|---|
| DE | 1951186 A1 | 4/1971 |
| DE | 2247867 A1 | 4/1973 |
| SU | 671011 A1 | 6/1979 |

OTHER PUBLICATIONS

Mohlenkamp: "Inverter Motor With Sinusoidal Starting Currents, OA Surver" European Transactions on Electriacl Power Engineering, VDE Verlag DE Jan. 1, 1994.

\* cited by examiner

OPERATING CIRCUIT FOR COUPLING A SYNCHRONOUS MACHINE WITH A VOLTAGE NETWORK AND METHOD FOR OPERATING IT

BACKGROUND OF THE DISCLOSURE

The invention relates to an operating circuit for coupling a synchronous machine with a voltage network and a method for operating a synchronous machine by means of an operating circuit.

Synchronous machines are often used in power plants to provide electrical energy for a voltage network in generator mode. It is necessary that the operating circuit provides the most constant frequency possible of an AC voltage for the voltage network load-independently. The operating circuit must also permit a startup of the synchronous machine which, unlike an asynchronous machine, does not permit any slip between the rotor field and the stator field.

In such operating circuits, energy efficiency plays an extremely important role. In power plants, high powers are generated and, over the service life, a great deal of electrical energy is generated. Even small improvements in the range of a few tenths of percent in the efficiency of the operating circuit have tremendous importance in terms of the efficiency of a power plant.

Nowadays, in such operating circuits, converter circuits with a DC voltage intermediate circuit are often used to adapt an AC voltage frequency for the voltage network to an AC frequency of the generator. The AC voltage generated by the generator is first rectified and then the rectified voltage is provided to a DC voltage intermediate circuit. In general, a capacitor for smoothing and buffering the rectified voltage is arranged in the DC voltage intermediate circuit. The rectified voltage of the DC voltage intermediate circuit is then converted in an inverter stage into the AC voltage of the voltage network and is thus independent of the AC voltage frequency of the generator. Such inverters are known e.g. under the name VSI (voltage source inverter). Inverters with a DC voltage intermediate circuit have an efficiency of approx. 98%.

Starting from the known operating circuits, it can be regarded as an object of the invention to improve the efficiency of operation of a synchronous machine, e.g. a power plant.

This object is achieved by an operating circuit having the characteristics disclosed herein.

BRIEF SUMMARY

An operating circuit according to the invention is set up for coupling a synchronous machine with a voltage network. The synchronous machine and the operating circuit are e.g. part of a power plant, such as a hydroelectric power plant, wind power plant, ship, etc., which can deliver electrical power (active power and/or reactive power) to the power grid or draw electrical power from the power grid.

The operating circuit has a converter circuit that can be controlled by a control unit. The converter circuit has a converter input connected to the synchronous machine and a converter output connected to the voltage network. The converter circuit has a plurality of converter switches and a switching arrangement. The converter switch and the switching arrangement can be controlled by the control unit.

By means of the switching arrangement, the converter circuit can be switched between at least two configurations, a start converter configuration and a direct converter configuration. In the start converter configuration, the synchronous machine can be operated and started as a motor. In the direct converter configuration, the synchronous machine can operate e.g. as a generator and provide electrical power to the voltage network. In the direct converter configuration, no DC voltage intermediate circuit is present and the AC voltage at the converter input is converted directly into an AC voltage at the converter output, without intermediate conversion into a DC voltage. In the direct converter configuration, the AC voltage at the converter output is adjusted by the control unit so that a preset frequency and optionally also a preset voltage value (maximum value or effective value, etc.) is achieved that corresponds to the mains frequency of the voltage network, e.g. 50 Hz or 60 Hz. In contrast, in the start converter configuration, conversely, the frequency at the converter input can be set to permit a frequency start of the synchronous machine.

Thus, the operating circuit can be operated in two different configurations whereby, in the direct converter configuration, the frequency at the converter output and in the start converter configuration and the frequency at the converter input and optionally also the voltage value can be controlled or regulated.

The converter circuit has a high efficiency, e.g. 99% or more. Thus, the efficiency of the converter circuit according to the invention in the direct converter configuration is up to 1% higher than in conventional converter circuits. In generator mode of the synchronous machine in the direct converter configuration, harmonics that occur during the inversion at the converter input have a disadvantageous effect on the efficiency of the synchronous machine. Nevertheless, the operating circuit can achieve a total of about 0.7% to 0.9% higher overall efficiency than previously known operating circuits.

It is advantageous for the control device to be set up to control the converter circuit in the start converter configuration such that the frequency of the AC voltage at the converter input is controlled. In particular, the frequency of the AC voltage at the converter input can be increased continuously up to an operating frequency of about 100-120 Hz. As a result, e.g. a frequency start of the synchronous machine can be achieved.

It is advantageous for the converter circuit in the direct converter configuration to form a direct converter, a so-called "cycloconverter". The direct converter or cycloconverter can be operated e.g. in a so-called V-circuit (also referred to as "open delta"), i.e. in a delta connection, in which two potentials at a respective triangular point are coupled only with each other via the potential of the third triangular point.

In one exemplary embodiment, the converter circuit in the starting converter configuration forms a load-commutated converter or inverter (also called "LCI" or "current source drive").

It is also advantageous for the converter circuit to have at least one DC intermediate circuit or DC voltage intermediate circuit in the starting converter configuration. As a result, a better decoupling of the AC voltage frequency at the converter input relative to the converter output can be achieved, whereby the startup of the synchronous machine in motor operation is simplified. For this purpose, the converter switch can be controlled such that the voltage applied to the converter output AC voltage of the power supply network is first rectified into a DC of the DC intermediate circuit or an intermediate voltage of the DC voltage intermediate circuit and then inverted into an AC or an AC voltage at the converter input for the synchronous machine.

To start the synchronous machine, a pony motor can also be used.

The control device be set up to control the converter circuit in the direct converter configuration such that an alternating voltage having a preset and, in particular, a constant frequency is applied to the converter output, e.g. 50 Hz or 60 Hz.

In one exemplary embodiment, the converter circuit can have at least two converter branches, each having a first output terminal and a second output terminal of the converter branch, and a first input terminal and a second input terminal, and a third input terminal of the converter branch. In this case, two output terminals of two converter branches can be connected directly to one another such that they are at the same potential. The output terminals can be short-circuited, so to speak.

In one embodiment of the converter circuit, each converter branch has a bridge circuit with four controllable converter switches for each input terminal. Two bridge switches each form a bridge branch of the bridge circuit. In particular, in a first bridge branch, a first bridge point is connected to the first output connection via a first converter switch and to the second output connection of the converter branch via a second converter switch. In a second bridge branch of the same bridge circuit, a second bridge point is connected to the first output terminal via a third converter switch and to the second output terminal via a fourth converter switch. Such a bridge circuit exists separately for each existing input terminal in a converter branch.

Each converter branch has exactly twelve converter switches.

The converter switches are formed e.g. from one or alternatively from two antiparallel-connected semiconductor switches. In one exemplary embodiment, each converter switch is formed from one or more serially connected thyristors. By means of a series circuit, the blocking voltage can be increased.

It is also advantageous for each converter branch to have a first choke coil and a second choke coil. For example, the first choke coil may be arranged directly between the first converter switch and the third converter switch, and the second choke coil may be arranged directly between the second converter switch and the fourth converter switch of each bridge circuit. The choke coil can be arranged in the start converter configuration in a DC voltage intermediate circuit and form a direct-link inductor. In the direct converter configuration, the first choke coil is connected directly to the first output terminal and the second choke coil is connected directly to the second output terminal of the respective converter branch. In one exemplary embodiment, a tap on the respective choke coil may constitute the output terminal. The output terminal may also be arranged between a choke coil and one of the converter switches.

To operate the synchronous machine, it can be brought from a standstill initially to an operating speed. During this startup, the converter circuit is in the start converter configuration. In this start converter configuration, the speed of the synchronous machine is increased until the frequency of the AC voltage at the converter input has reached an operating frequency. Then the converter circuit can be switched to the direct converter configuration.

In the direct converter configuration, the synchronous machine can be operated both as a generator and as a motor. The synchronous machine can draw or supply active power and/or reactive power from the voltage network. Thus, a four-quadrant operation is possible.

The direction of rotation of the synchronous machine is determined during startup. If the direction of rotation is reversed, the speed is reduced and, so to speak, a new start in the other direction of rotation started. The direction of rotation can depend on whether the synchronous machine—at least principally—is operated as a motor or generator. Depending on the current torque on an input shaft and an output shaft of the synchronous machine, however, a transition from motor to generator mode (or vice versa) can occur even without a reversal of the direction of rotation.

BRIEF DESCRIPTION OF THE DRAWINGS

Advantageous embodiments of the invention are evident from the dependent claims, the description and the drawings. Hereinafter, embodiments of the invention will be explained with reference to the accompanying drawings. The drawings in detail:

DETAILED DESCRIPTION

Figure 1:
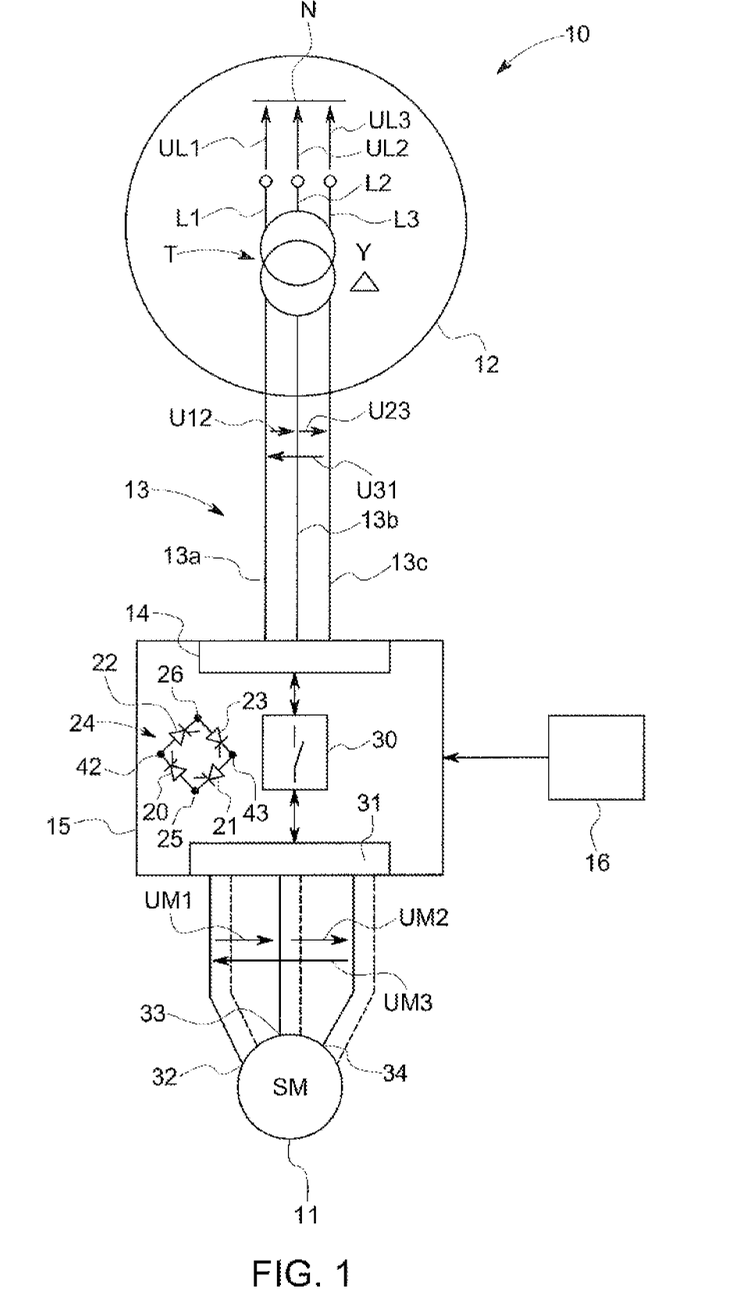
FIG. 1 shows a block diagram of an operating circuit with a converter circuit and a switching arrangement.

FIG. 1 shows a schematic diagram in the manner of a block diagram of an operating circuit 10 that is adapted to couple a synchronous machine 11 with a voltage network 12. The power supply network 12 is e.g. a three-phase power supply network. The power supply network 12 may include a transformer T. The power supply network 12 is electrically connected via a grid-side line 13 to a converter output 14 of a converter circuit 15. The grid-side line 13 has a first conductor 13*a*, a second conductor 13*b* and a third conductor 13*c* that are each connected to a phase or an external conductor L1, L2, L3 of the power supply network 12. Between the conductors 13*a*, 13*b*, 13*c* in each case, a nominal conductor voltage U12, U23, U31 arises. In relation to a neutral conductor N, each phase conductor L1, L2, L3 has a respective nominal phase voltage UL1, UL2, UL3. The nominal phase voltages UL1, UL2, UL3 each have the same effective value, e.g. 230 V, the same frequency, e.g. 50 Hz, and are phase-shifted by 120 degrees relative to one another. The effective value and the frequency can vary depending on the country or region in the world.

The converter circuit 15 has a plurality of converter switches that can be controlled by a control unit 16 of the operating circuit 10. According to the example, in each case a first converter switch 20, a second converter switch 21, a third converter switch 22 and a fourth converter switch 23 form a common bridge circuit 24. The first converter switch 20 and the second converter switch 21 are each connected directly via a first bridge point 25 and form a first bridge branch 24a of the bridge circuit 24, while the third converter switch 22 and the fourth converter switch 23 are connected directly via a common second bridge point 26 and form a second bridge branch 24b of the same bridge circuit 24. The converter circuit 15 has a plurality of such bridge circuits 24.

The converter circuit 15 also includes a switching arrangement 30 that can be controlled by the control unit 16. The switching arrangement 30 has at least one circuit breaker and/or at least one changeover switch whose switching position can be adjusted by means of the control unit 16. The switching arrangement 30 is configured to switch the converter circuit 15 between a start converter configuration I and a direct converter configuration II. For the exemplary embodiment of the converter circuit 15 of FIG. 2, the start converter configuration I is shown in FIG. 3 and the direct converter configuration II is shown in FIG. 4.

The synchronous machine 11 is connected to a converter input 31 of the converter circuit 15. More specifically, the stator winding of the synchronous machine 11 for each terminal pair has three winding strands that are electrically connected via three winding terminals 32, 33, 34 of the synchronous machine 11 to the converter input 31 of the converter circuit 15. The winding strands can be electrically connected e.g. in a delta connection between the winding terminals 32, 33, 34, whereby a machine voltage UM1, UM2, UM3 is applied to each winding, e.g. a first machine voltage UM1 between the first winding terminal 32 and the second winding terminal 33, a second machine voltage UM2 between the second winding terminal 33 and the third winding terminal 34 and a third machine voltage UM3 between the third winding terminal 34 and the first winding terminal 32. The machine voltages UM1, UM2, UM3 are phase-shifted according to their offset arrangement of the windings in the direction of rotation of the rotor of the synchronous machine 11.

The synchronous machine 11 can also have more than one terminal pair, in which case there are three windings with three winding connections for each terminal pair as shown in FIG. 1 by dashed lines for a second terminal pair.

Figure 2:
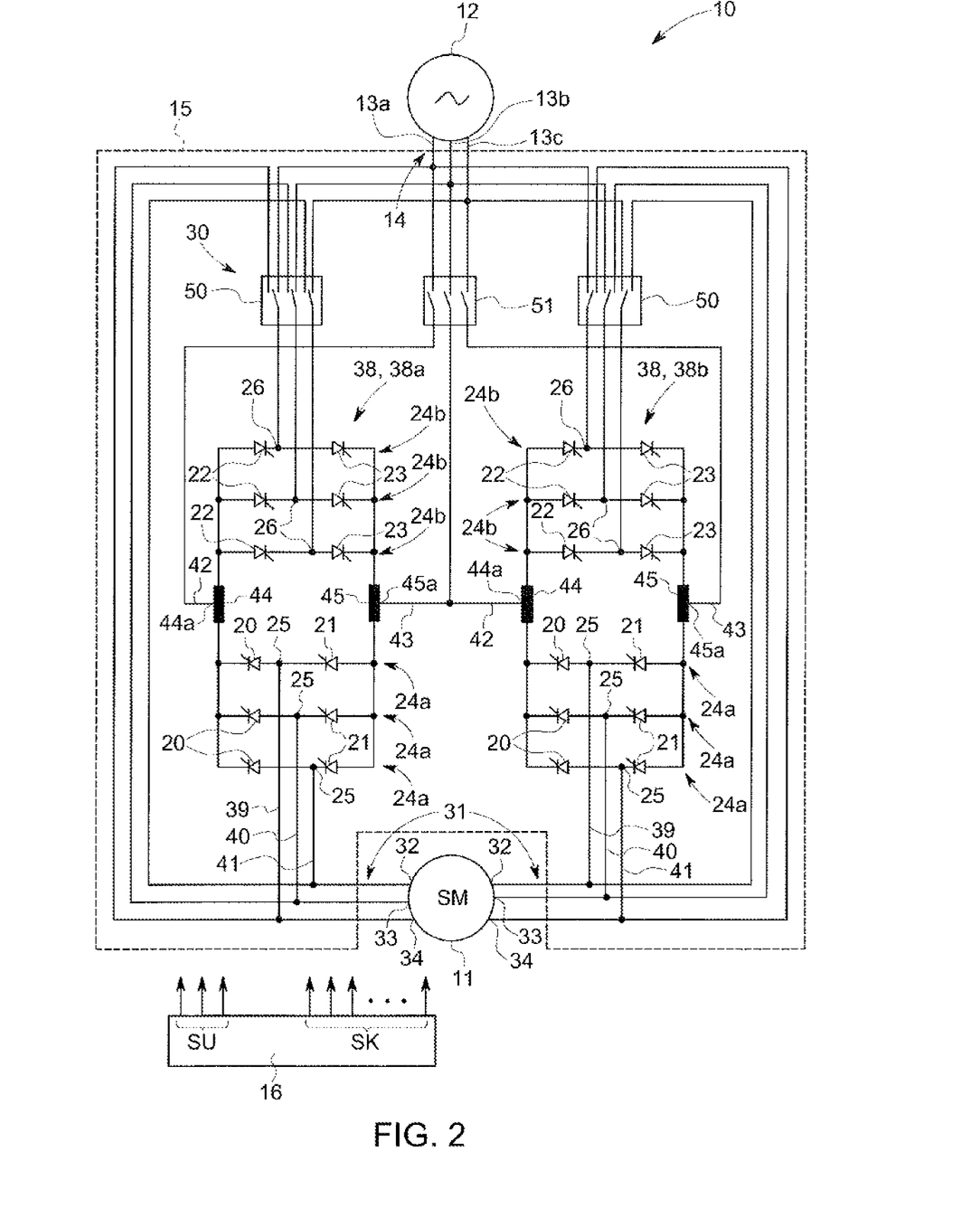
FIG. 2 shows a block diagram of an operating circuit with an exemplary embodiment of a converter circuit and an exemplary embodiment of a switching arrangement.
Figure 3:
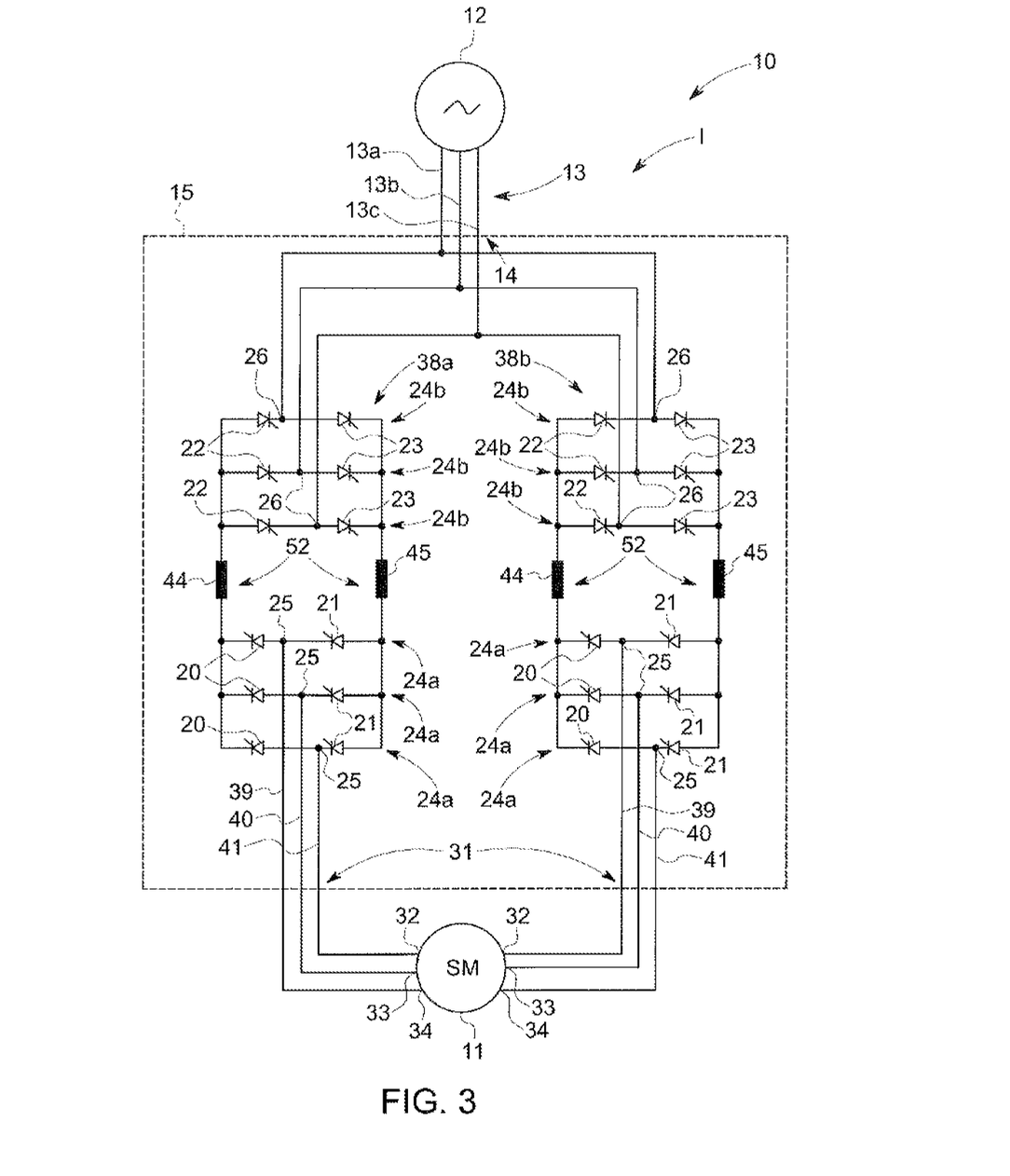
FIG. 3 shows an equivalent circuit diagram of the operating circuit of FIG. 2 in a start converter configuration of the converter circuit.
Figure 4:
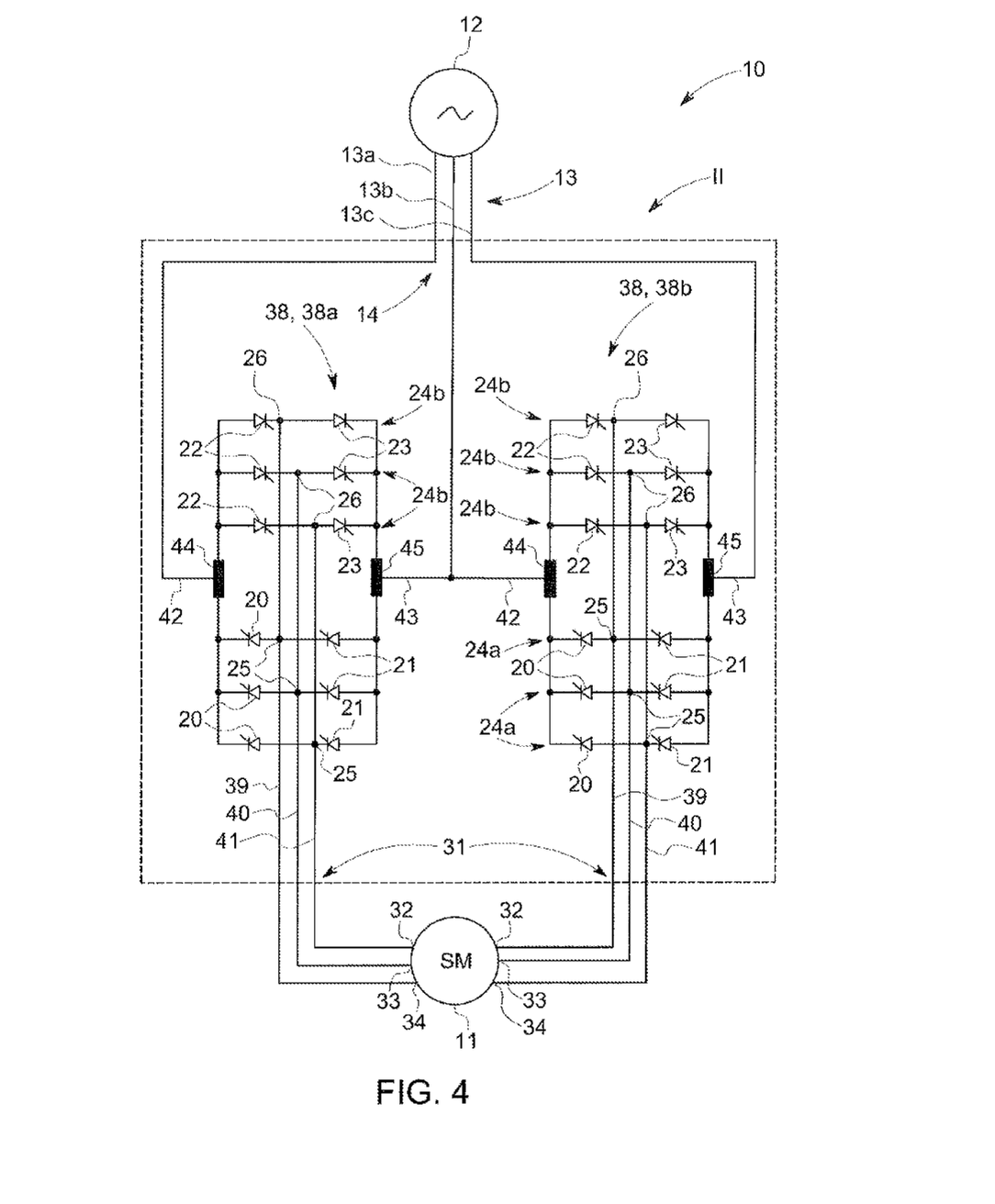
FIG. 4 shows an equivalent circuit diagram of the operating circuit of FIG. 2 in a direct converter configuration of the converter circuit.

FIGS. 2 to 4 illustrate an exemplary embodiment of an operating circuit 10 or a converter circuit 15 and a switching arrangement 30. The terminal pair number of the synchronous machine 11 used is p=2. For each terminal pair, the converter circuit 15 has one and, in particular, exactly one converter branch 38. Thus, in the exemplary embodiment, a first converter branch 38a and a second converter branch 38b are present. Each converter branch 38 has e.g. three bridge circuits 24. Each first bridge point 25 of a bridge circuit 24 of a converter branch 38 is connected to a separate input terminal of the converter branch 38, whereby e.g. a first input terminal 39, a second input terminal 40 and a third input terminal 41 are each connected to a first bridge point 25 of one of the bridge circuits 24.

All bridge branches 24a, 24b of the same converter branch 38 are connected at one end to a first output terminal 42 and at the opposite end to a second output terminal 43 of the respective converter branch 38. The first converter switches 20 of each first bridge branch 24a are connected via the first output terminal 42 to the third converter switches 22 of each second bridge branch 24b. The second converter switches 21 of each first bridge branch 24a are connected via the second output terminal 43 to the fourth converter switches 23 of each second bridge branch 24b.

In the exemplary embodiment shown here, all of the first converter switches 20 of the same converter branch 38 are connected to the third converter switches 22 via a first choke coil 44. The second converter switches 21 are each connected via a second choke coil 45 to the fourth converter switches 23 of the same converter branch 38. In addition, the first choke coil 44 is connected directly to the first output terminal 42 and the second choke coil 45 is connected directly to the second output terminal 43. In the exemplary embodiment according to FIGS. 2 to 4, the output connections 42, 43 are formed by a respective tap 44a on the first choke coil 44 and a tap 45a on the second choke coil 45.

In the exemplary embodiment shown, the switching arrangement 30 has two changeover switches 50 and a circuit breaker 51. The three output-side terminals of the circuit breaker 51 are each connected to a conductor 13a, 13b, 13c of the line 13. On the input side, one terminal of the circuit breaker 51 is connected to the first output terminal 42 of the first converter branch 38a, and another terminal is connected to the second output terminal 43 of the second converter branch 38b. A third input-side terminal of the circuit breaker 51 is connected to the second output terminal 43 of the first converter branch 38a and to the first output terminal 42 of the second converter branch 38b that are connected to one another and have the same potential.

Each converter branch 38 is assigned to a changeover switch 50 whose three input-side connections are each connected to a second bridge point 26 of the three bridge circuits 24 of the assigned converter branch 38. For each input-side terminal, each changeover switch 50 has two assigned output-side terminals, one of which is connected to an input terminal 39, 40, 41 of the assigned converter branch 38 and the other to a conductor 13a, 13b, 13c of the line 13. Thus, depending on the switching position of the changeover switch 50, the second bridge points 26 can either be electrically connected directly to the respective first bridge point 25 of the same bridge circuit 24 or can be electrically connected directly to one of the conductors 13a, 13b or 13c.

The control device 16 provides one or more switching signals SU for switching the switching arrangement 30 depending on the number of switches to be controlled separately, e.g. three switching signals SU for the two changeover switches 50 and the circuit breaker 51. The control unit 16 also provides a plurality of converter switching signals SK to drive the converter switches 20, 21, 22, 23 and to switch e.g. from the blocking to the conducting state or vice versa. For example, the control unit 16 can provide a converter switching signal SK for each existing converter switch.

The converter switches 20, 21, 22, 23 are formed e.g. by a respective thyristor. As converter switches, other controllable semiconductor switches can also be used. It is also possible to form a converter switch with a plurality of semiconductor switches, e.g. antiparallel-connected thyristors or the like. As a converter switches, all known semiconductor switches or semiconductor switch arrangements can be used.

FIG. 3 shows the equivalent circuit diagram of the operating circuit 10 in the start converter configuration I. The circuit breaker 51 is here in its non-conductive position and the changeover switches 50 connect the second bridge points 26 of the bridge circuits 24 respectively with a conductor 13a or 13b or 13c of the line 13. Each converter branch 38 of the converter circuit 15, in the start converter configuration I, forms a load-commutated converter with a DC intermediate circuit 52 on the choke coils 44, 45. The control unit 16 controls the third converter switch 22 and the fourth converter switch 23 such that the AC voltage of the power supply network 12 applied to the converter input 14 is rectified to a DC current between the first choke coil 44 and the second choke coil 45. The control unit 16 controls the first converter switches 20 and the second converter switches 21 such that the DC current in the DC intermediate circuit 52 is reversed to an AC current at the converter output 31 with a preset AC frequency. Thus, the synchronous machine 11 can be accelerated by frequency starting in motor operation up to an operating speed. The start converter configuration I is maintained until an AC current having an AC frequency of 50 Hz or 120 Hz is applied to the converter output 31. Thus, the machine voltages UM1, UM2, UM3 have a corresponding frequency of 50 Hz or 120 Hz when the startup of the synchronous machine 11 is completed.

After this startup, the converter circuit 15 is switched to the direct converter configuration II shown in FIG. 4. For this purpose, the circuit breaker 51 is brought into its conducting position and connects the conductors 13a, 13b, 13c of the line 13 at the converter output 14 with the output terminals 42, 43 of the converter branches 38. The changeover switches 50 are changed to a switching position, such that in each case the first bridge point 25 is connected directly to the second bridge point 26 of the same bridge circuit 24 and has the same potential. Thus, both the first bridge point 25 and the second bridge point 26 of each bridge circuit 24 are connected directly to the assigned input terminal 39 or 40 or 41 of the converter branch 38. In the direct converter configuration II, the converter circuit 15 forms a direct converter or a so-called cycloconverter. The control unit 16 controls the converter switches 20, 21, 22, 23 in the direct converter configuration II such that the machine voltages UM1, UM2, UM3 are inverted directly without intermediate rectification to an AC voltage applied to the converter output 14 with a defined AC frequency of e.g. 50 Hz or 60 Hz. This takes place directly without intermediate rectification, such that the converter circuit 15 in the direct converter configuration II does not have or form a DC intermediate circuit.

Figure 5:
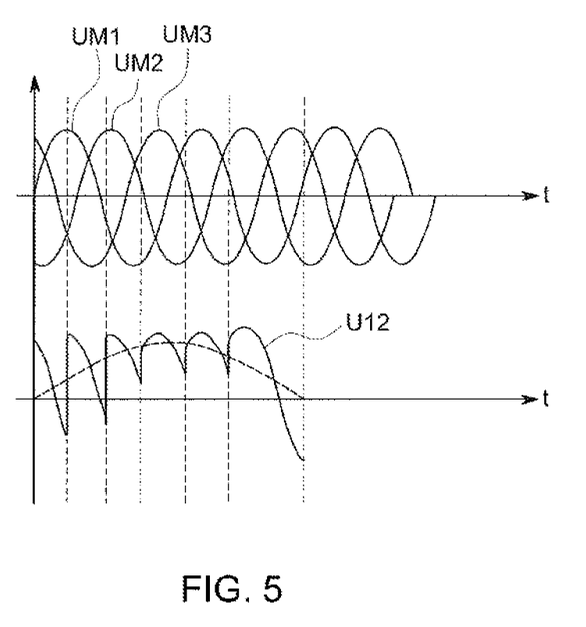
FIG. 5 shows an exemplary, schematic basic representation of the operation of the converter circuit according to FIGS. 1 to 4 in the direct converter configuration.

FIG. 5 shows in a highly schematized manner the voltage profile of the machine voltages UM1, UM2, UM3. In the direct converter configuration II, an AC voltage applied to the converter output 14 is generated by controlling the converter switches 20, 21, 22, 23; said AC voltage is composed in sections from the time profiles of the three machine voltages UM1, UM2, UM3. By way of example, FIG. 5 shows a first nominal conductor voltage U12. FIG. 5 is intended to show only the working principle of the converter circuit 15 in the direct converter configuration II. The actual voltage profile of the nominal conductor voltages U12, U23, U31 can deviate from the schematic illustration in FIG. 5, depending on the switching times selected and the control of the converter switches 20, 21, 22, 23.

Figure 6:
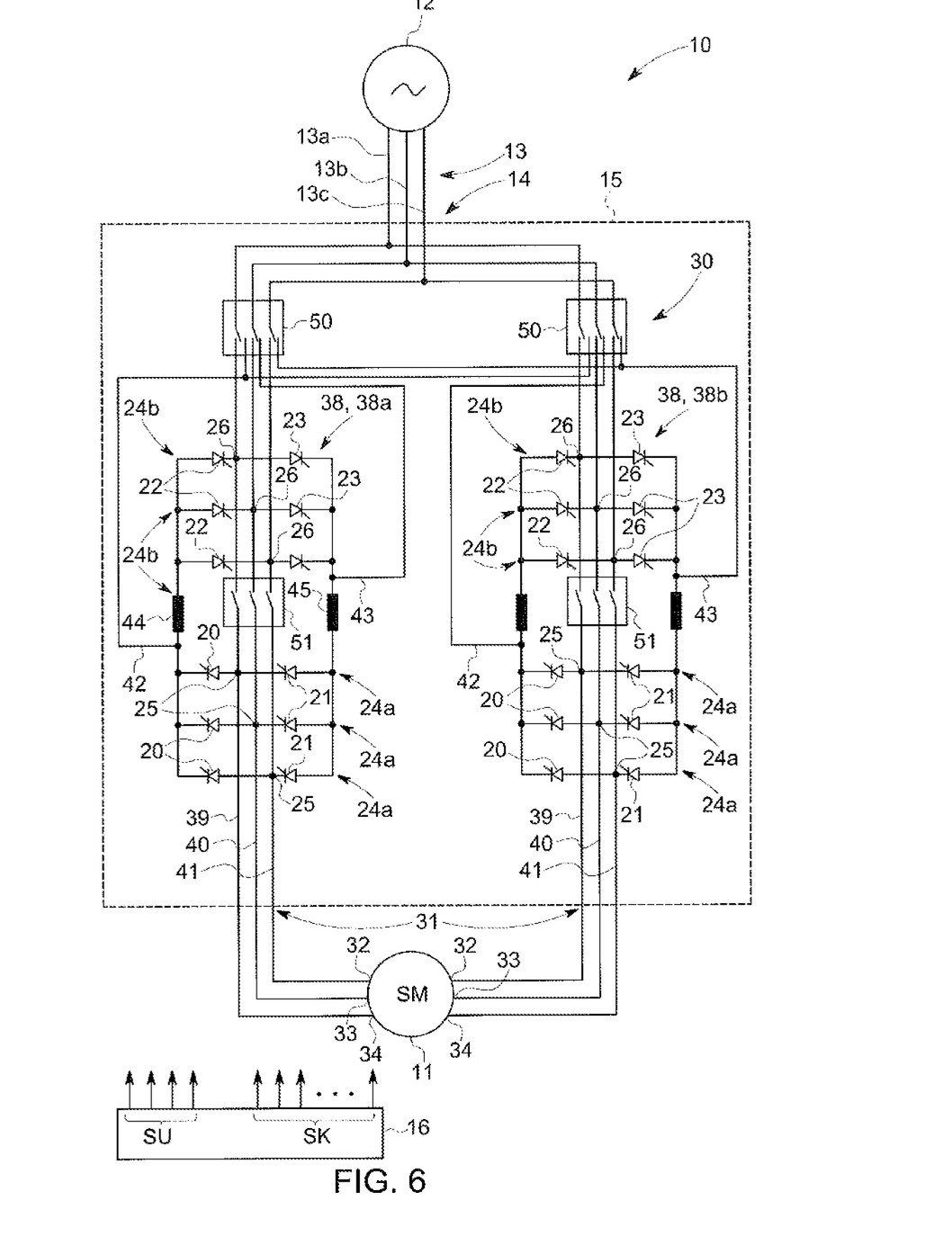
FIGS. 6 and 7 are each a block diagram of another exemplary embodiment of an operating circuit.

FIG. 6 shows a modified exemplary embodiment of the converter circuit 15. The connection between the synchronous machine 11 and the two converter branches 38 and the structure of the two converter branches 38 is equal to the previously described exemplary embodiment according to FIGS. 2 to 4, such that reference can be made to the above explanation. The structure of the switching arrangement 30 differs from the previous exemplary embodiment. In the example of FIG. 6, the switching arrangement 30 has two circuit breakers 51 each of which is assigned to a converter branch 38a or 38b and each of which is arranged in the connection between the first bridge point 25 and the second bridge point 26 of each bridge circuit 24. Each circuit breaker 51 can establish or interrupt a direct electrical connection between the first bridge point 25 and the second bridge point 26 of all bridge circuits 24 of the respective converter branch 38a or 38b.

The switching arrangement 30 in this exemplary embodiment also includes two changeover switches 50 whose three output terminals are each connected to one of the three conductors 13a, 13b, 13c of the line 13 at the converter output 14. Each output-side terminal of a changeover switch 50 is assigned to two input-side terminals, one of which is connected to one of the second bridge points 26 of the assigned converter branch 38a or 38b and the other of which is connected to a first output terminal 42 or a second output terminal 43 of a converter branch 38. In the exemplary embodiment, the first output terminal 42 and the second output terminal 43 of the first converter branch 38a and the second output terminal 43 of the second converter branch 38b are each connected to an input-side terminal of the changeover switch 50 assigned to the first converter branch 38a. The first output terminal 42 and the second output terminal 43 of the second converter branch 38b and the first output terminal of the first converter branch 38a are each connected to an input-side terminal of the changeover switch 50 that is assigned to the second converter branch 38b.

The output terminals 42, 43 are not formed by taps of the choke coils 44, 45, unlike in the previously described exemplary embodiment. Rather, the first output terminal 42 is formed by the connection point of the first choke coil 44 to the first bridge branches 24a and the second output terminal 43 is formed by the connection point of the second choke coil 45 to the second bridge branches 24b of the bridge circuits 24.

In an exemplary embodiment according to FIG. 6, the converter circuit 15 is switched to the start converter configuration I by the switches connecting the converter input 14 to the second bridge points 26 of the bridge circuits 24 and the circuit breakers 51 are in their non-conducting position, such that the first bridge points 25 and the second bridge points 26 are not connected directly to one another. In the equivalent circuit, this results in a circuit as shown in FIG. 5. For the mode of operation, reference is made to the explanation for FIG. 5.

In the direct converter configuration II, the circuit breakers 51 are conductive and the output terminals 42, 43 of the two converter branches 38 are electrically connected via the changeover switch 50 to the converter output 40. The converter circuit 15 forms a direct converter without a DC intermediate circuit and operates analogously to direct converter configuration II according to the previous exemplary embodiment of FIG. 3.

Figure 7:
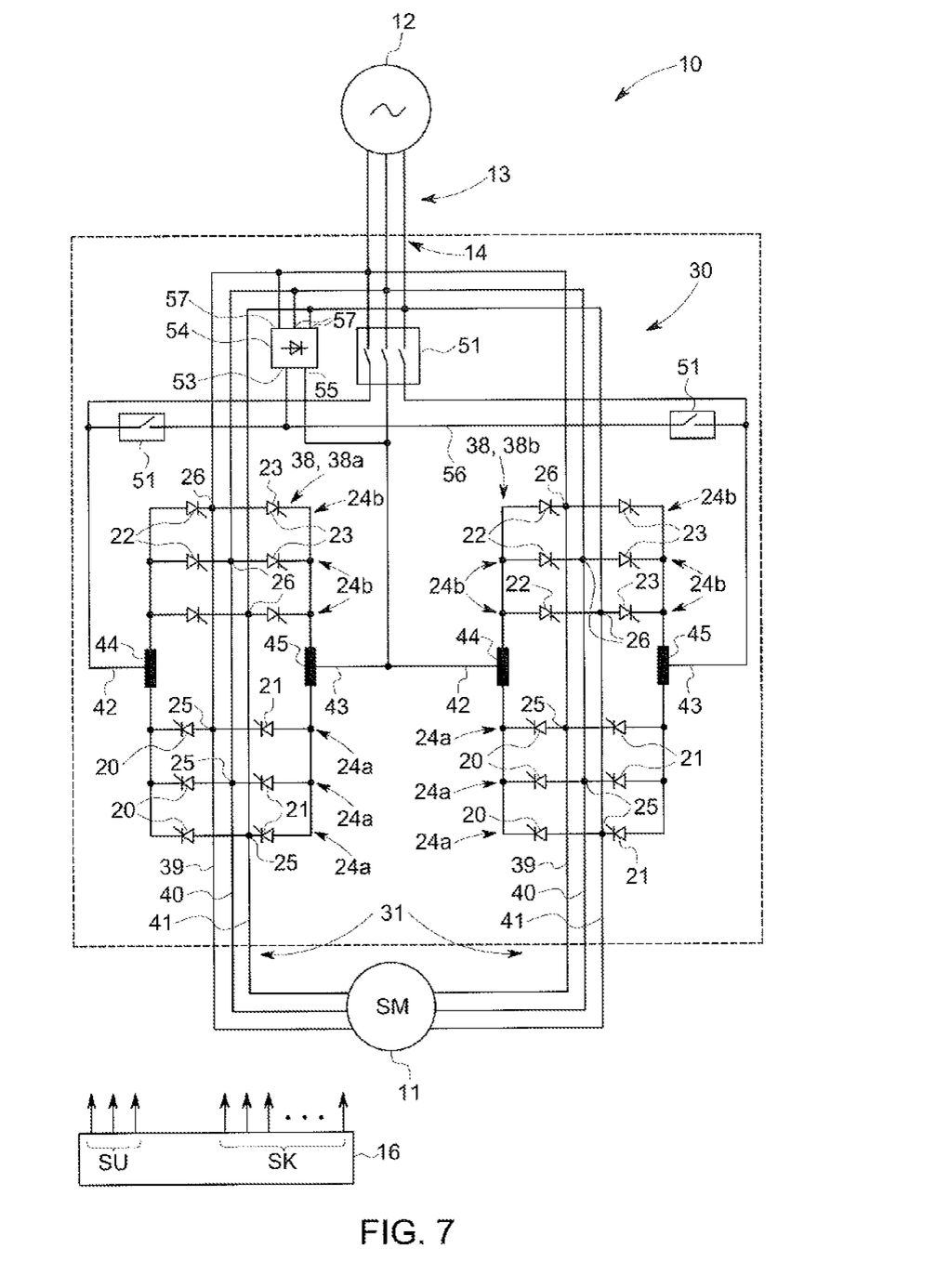

A further modification of the converter circuit 15 with a modified switching arrangement 30 is shown in FIG. 7. In contrast to the previous exemplary embodiments, in each converter branch 38 the first bridge point 25 and the second bridge point 26 of the same bridge circuit 24 are directly electrically connected to one another and thus each to an input terminal 39, 40, 41 of the converter branch 38a or 38b. The output terminals 42, 43 are formed by taps on the choke coils 44, 45 and implemented analogously to the exemplary embodiment according to FIGS. 2 to 4. Analogously to the exemplary embodiment shown in FIG. 2, the switching arrangement 30 has a three-phase circuit breaker 51 between the converter output 14 and the output terminals 42, 43. For the exact connection of the circuit breaker 51 to the output terminals 42, 43, reference is made to the description related to FIG. 2.

In addition, the switching arrangement 30 has two additional single-phase circuit breakers 51, each having only one input terminal and output terminal. The two single-phase circuit breakers 51 are arranged in a series connection between the first output terminal 42 of the first converter branch 38a and the second output terminal 43 of the second converter branch 38b and are connected directly to one another by means of a connecting line 56. A first rectifier output 53 of a rectifier circuit 54 is connected to the connecting line 56. A second rectifier output 55 of the rectifier circuit 54 is connected to the second output terminal 43 of the first converter branch 38a and the first output terminal 42 of the second converter branch 38b. The rectifier circuit 54 has three rectifier inputs 57 that are each connected to the converter output 14 and thus to one of the conductors 13a, 13b, 13c of the line 13.

The control unit 16 controls the switching arrangement 30 to form the start converter configuration I, such that the two single-phase circuit breakers 51 establish a conductive connection between the first rectifier output 53 and the respectively assigned output connection 42 or 43 of the converter branches 38. The three-phase circuit breaker 51 between the converter output 14 and the converter branches 38 is in its non-conductive position, such that the rectifier circuit 54 is not bridged and therefore effective. To start the synchronous machine 11 in motor operation, the AC voltage on the converter output 14 is rectified by the rectifier circuit 53 and inverted by controlling the third converter switch 22 and fourth converter switch 23 and provided at the converter input 31. The first converter switch 20 and the second converter switch 21 can remain in their non-conductive position. In the direct converter configuration II, the three-phase circuit breaker 51 is switched to its conducting state and the two single-phase circuit breakers 51 are brought into their non-conducting state, such that the rectifier circuit 54 is ineffective and the output terminals 42, 43 of the converter branches 38 are connected to the converter output 14. By suitable control of the converter switches 20, 21, 22, 23, the alternating voltage applied to the converter input 31, i.e., the machine voltages UM1, UM2, UM3 can then be reversed without rectification and an alternating voltage with a preset frequency can be provided at the converter output 14.

Figure 8:
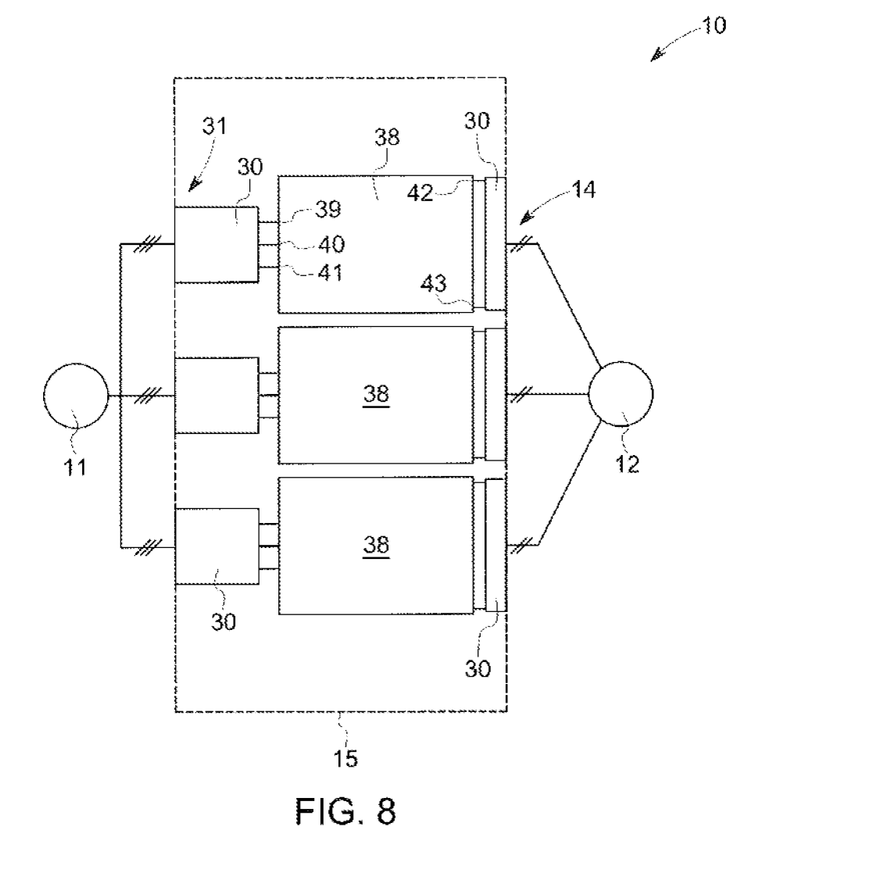
FIG. 8 is a block diagram of an operating circuit that is particularly suitable for the operation of a three-phase synchronous machine.

In the exemplary embodiments described so far, the synchronous machine 11 has two terminal pairs, each with three windings. FIG. 8 shows very schematically an arrangement in which a synchronous machine 11 is used with a terminal pair. In each case, two phases of the power supply network 12 can be linked via the switching arrangement 30 of the converter circuit 15, each with a converter branch 38. At the converter input 31, the three input terminals 39, 40, 41 of each converter branch 38 are connected to the three winding terminals of the synchronous machine 11. The exemplary embodiment shown in FIG. 8 can also have six converter branches 38 instead of three converter branches 38.

Figure 9:
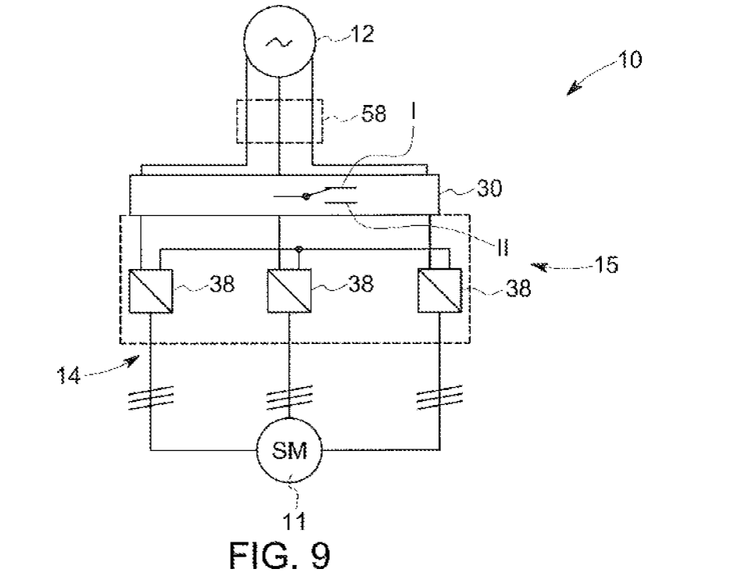
FIGS. 9 and 10 each show a further block diagram of an exemplary embodiment of an operating circuit for a synchronous machine having three or four winding systems each having three windings.

FIG. 9 shows a block diagram of another exemplary embodiment of an operating circuit 10 for a synchronous machine 11 having three separate winding systems, whereby each winding system has three windings. The winding systems are arranged offset by 20 degrees to one another in the synchronous machine and thus form a corresponding phase shift between the corresponding machine voltages. This results in a so-called 18-pulse system. As in the previously described exemplary embodiments, the converter circuit 15 can be switched between the start converter configuration I and the direct converter configuration II. Each winding system of the synchronous machine 11 is connected as shown to a converter branch 38, such that three parallel converter branches 38 are present here instead of two converter branches 38, as is the case in the exemplary embodiments according to FIGS. 2-4, 6 and 7.

Figure 10:
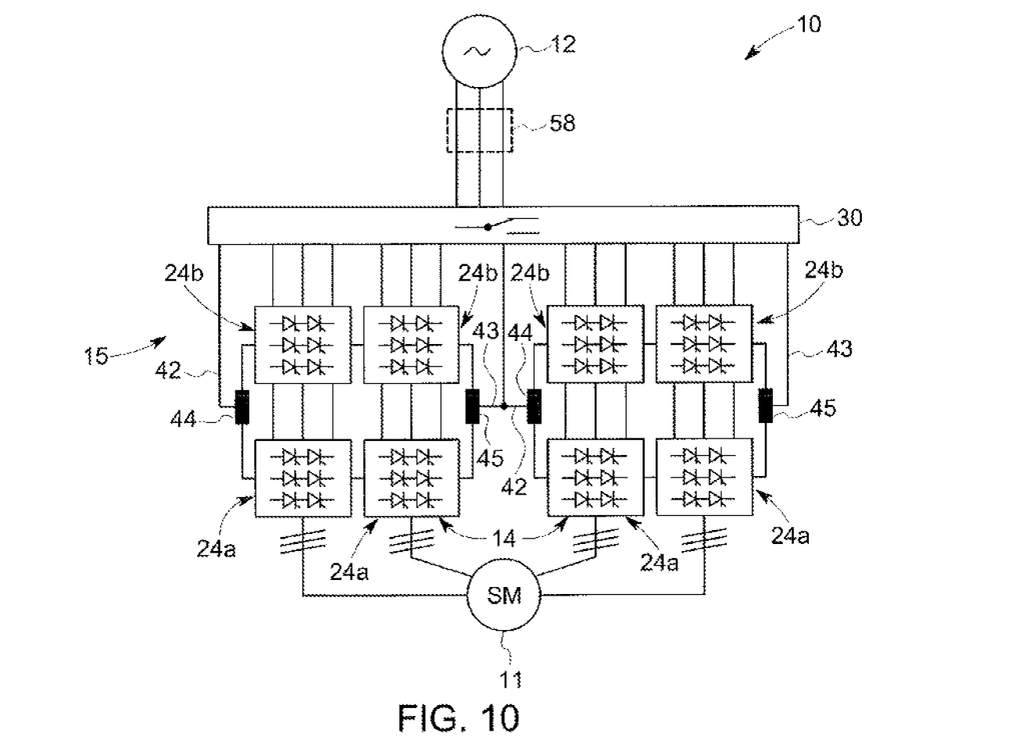

FIG. 10 shows a block diagram of an exemplary embodiment of the operating circuit 10, in which a synchronous machine 11 is used that has four winding systems each with three windings, such that a 24-pulse system is formed. Each three-phase winding system is connected to a converter branch 38 whereby, in each case, two converter branches 38 are connected in series between the first output terminal 42 and the second output terminal 43. For this purpose, in each case, the first bridge branches 24a and the second bridge branches 24b are connected in series, as shown schematically in FIG. 10. The four converter branches 38 thus form two first output terminals 42 and two second output terminals 43, whereby two of the output terminals 42, 43 are electrically connected together analogously to the exemplary embodiment in FIGS. 2, 4 and 7. The switching arrangement 30 can be designed analogously to the embodiment according to FIG. 2 or also according to FIG. 7.

As shown schematically in FIGS. 9 and 10, a filter and/or choke arrangement 58 can be arranged in the connection of the converter circuit 15 to the voltage supply network 12. The filter and/or choke arrangement 58 can also be present in all other exemplary embodiments. It can have a common-mode choke arrangement and/or a filter arrangement in order to eliminate or at least reduce disturbances to the AC voltages provided to the voltage supply network.

The invention relates to an operating circuit 10 and to a method for operating a synchronous machine 11 on a voltage supply network 12. The operating circuit 10 has a converter circuit 15 with a plurality of controllable converter switches 20 to 23 and a controllable switching arrangement 30 that is adapted to switch the converter circuit 15 between a start converter configuration I and a direct converter configuration II. The power supply network 12 is connected to a converter output 14 and the synchronous machine 11 is connected to a converter input 31 of the converter circuit 15. In the direct converter configuration II, an AC voltage is provided at the converter output 14 with a preset AC voltage frequency. The control unit 16 controls the converter switches 20 to 23 such that the AC voltage at the converter output 14 corresponds to preset requirements. In the direct converter configuration II, the switching of the AC voltage between the converter input 31 and the converter output 14 takes place without intermediate rectification. The start converter configuration I is used to start up the synchronous machine 11 in motor operation. For this purpose, the AC voltage of the voltage supply network 12 applied to the converter output 14 is converted into an AC voltage, in particular a variable frequency at the converter input 31 that is suitable in particular for starting the motor.

What we claim is:

1. An operating circuit for coupling a synchronous machine with a voltage network,
    with a converter circuit that can be controlled by a control unit having a converter input connected to the synchronous machine and a converter output connected to the voltage network, whereby the converter circuit has a plurality of converter switches that can be controlled by the control unit and a switching arrangement that can be controlled by the control unit, whereby the converter circuit is switched by means of the switching arrangement between a direct converter configuration and a start converter configuration, whereby the control unit is adapted to control the converter circuit in the direct converter configuration depending on a voltage profile at the converter input in order to set an alternating voltage with a preset frequency at the converter output wherein the converter circuit comprises at least two converter branches, each having a first output terminal and a second output terminal of the respective converter branch and respectively a first input terminal, a second input terminal and a third input terminal of the respective converter branch, and wherein two output terminals of different converter branches are connected to one another directly.

2. The operating circuit according to claim 1, wherein the control unit is adapted to control the converter circuit in the direct converter configuration depending on the voltage profile at the converter input in order to set an AC voltage with a preset voltage value at the converter output.

3. The operating circuit according to claim 1, wherein the control unit is adapted to control the converter circuit in the start converter configuration such that the frequency of the voltage at the converter input is controlled.

4. The operating circuit according to claim 3, wherein the control device is adapted to control the converter circuit in the start converter configuration such that the frequency of the AC voltage at the converter input is continuously increased up to an operating frequency.

5. The operating circuit according to claim 1, wherein the converter circuit in the direct converter configuration forms a direct converter or cycloconverter.

6. The operating circuit according to claim 1, wherein the converter circuit in the start converter configuration being connected to the voltage network and the synchronous machine, thereby forms a network-communicated and load-communicated converter.

7. The operating circuit according to claim 1, wherein the converter circuit in the start converter configuration has at least one DC voltage intermediate circuit or DC intermediate circuit.

8. The operating circuit according to claim 7, wherein the control device is adapted to control the converter switch such that the voltage at the converter output is first rectified into a direct current or a DC voltage and is then inverted into an alternating current or an AC voltage at the converter input.

9. The operating circuit according to claim 1, wherein the control device is adapted to control the converter circuit in the direct converter configuration such that an alternating voltage with a preset frequency is applied at the converter output.

10. The operating circuit according to claim 1, wherein each converter branch comprises a bridge circuit with four controllable converter switches for each input terminal, whereby a first bridge point is connected via a first converter switch to the first output terminal and is connected via a second converter switch to the second output terminal, and whereby a second bridge point is connected via a third converter switch to the first output terminal and is connected to the second output terminal via a fourth converter switch.

11. The operating circuit according to claim 1, wherein each converter branch has a first choke coil connected directly to the first converter switch and the third converter switch, and each converter branch has a second choke coil that is connected directly to the second converter switch and the fourth converter switch.

12. The operating circuit according to claim 11, wherein each choke coil in the start converter configuration of the converter circuit is arranged in a DC intermediate circuit.

13. The operating circuit according to claim 11, wherein, in the direct converter configuration of the converter circuit, the first choke coil is connected to the first output terminal and the second choke coil is connected to the second output terminal.

14. A method for operating a synchronous machine by means of an operating circuit according to claim 1, comprising:

switching of the converter circuit to the start converter configuration by means of the switching arrangement, increasing of the speed of the synchronous machine until an AC voltage at the converter input reaches an operating frequency, and switching of the converter circuit to the direct converter configuration by means of the switching arrangement.

* * * * *